Sept. 13, 1955 A. M. STELLE ET AL 2,717,590
THERMOSTATICALLY CONTROLLED WICK TYPE HEATER
Filed Nov. 7, 1949 6 Sheets-Sheet 4
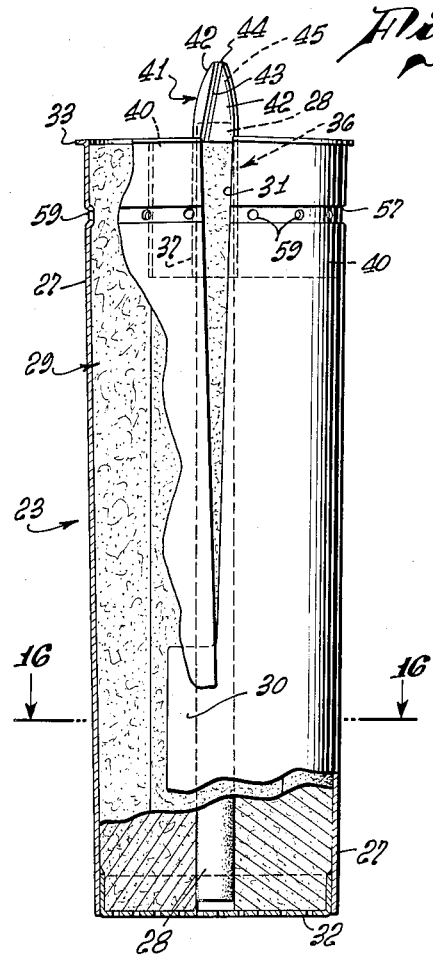
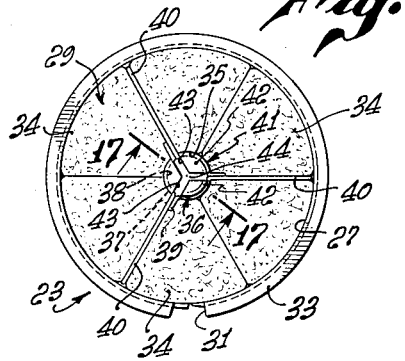
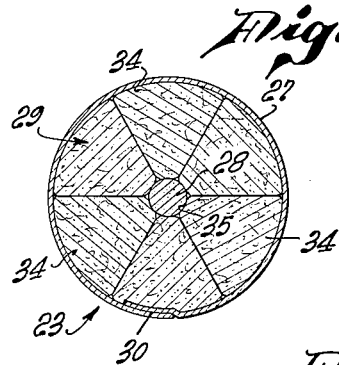
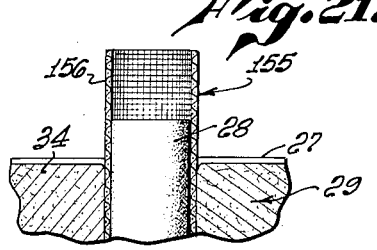
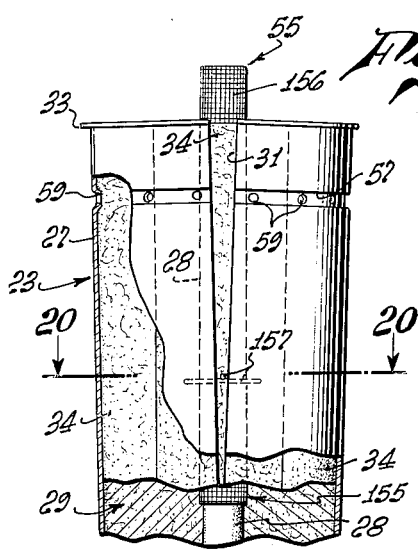
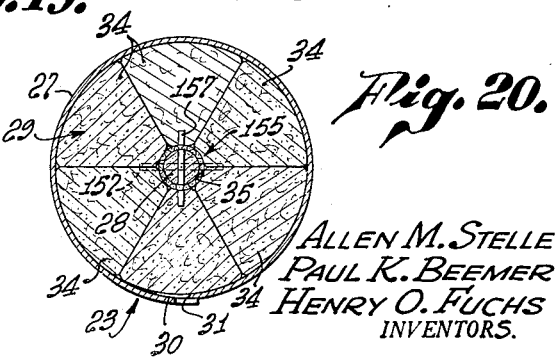
ALLEN M. STELLE
PAUL K. BEEMER
HENRY O. FUCHS
INVENTORS.
BY Barkalow & Scantlebury
ATTORNEYS.

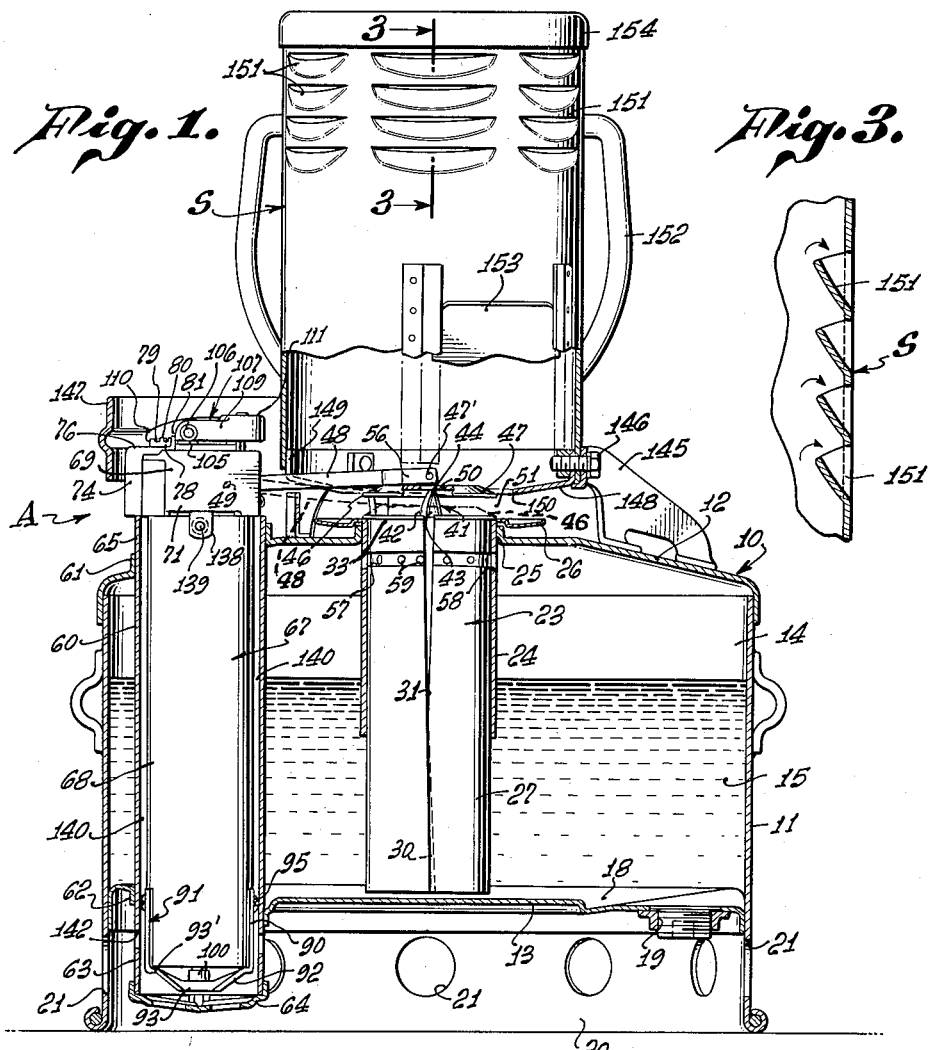

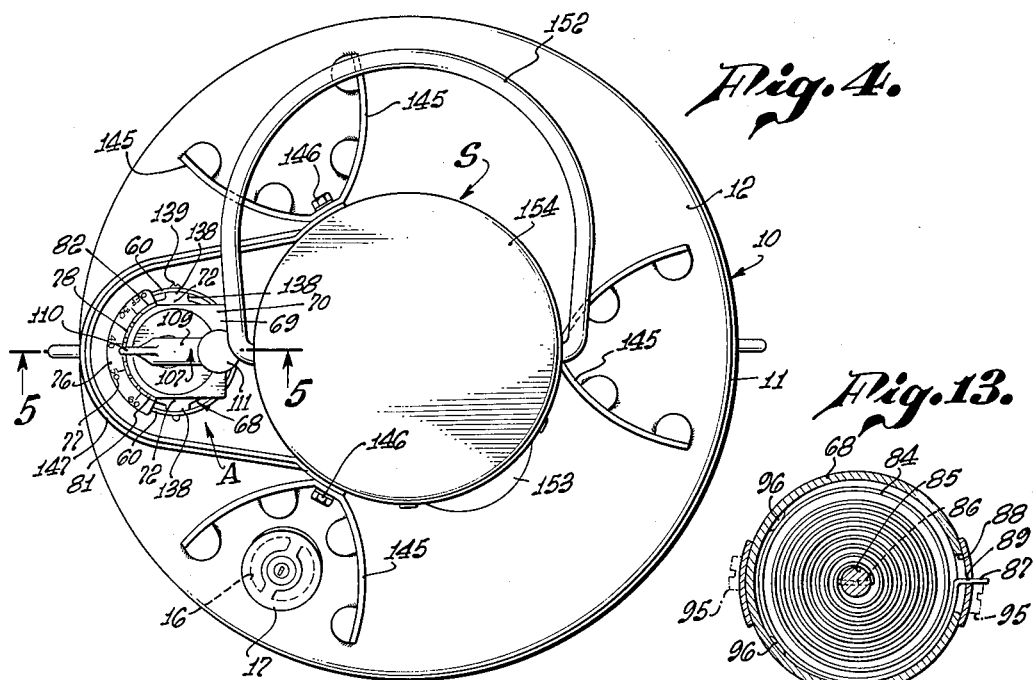

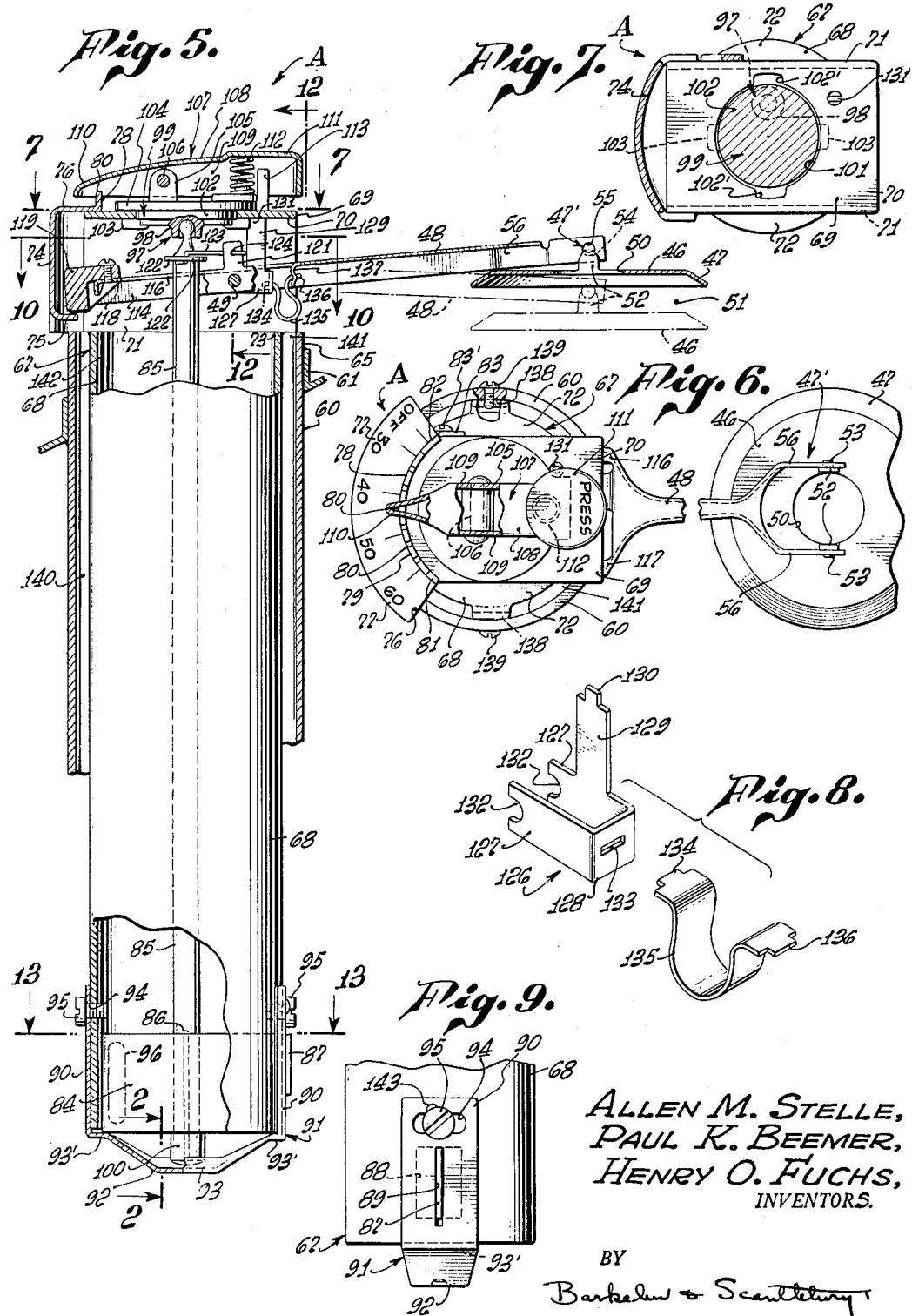

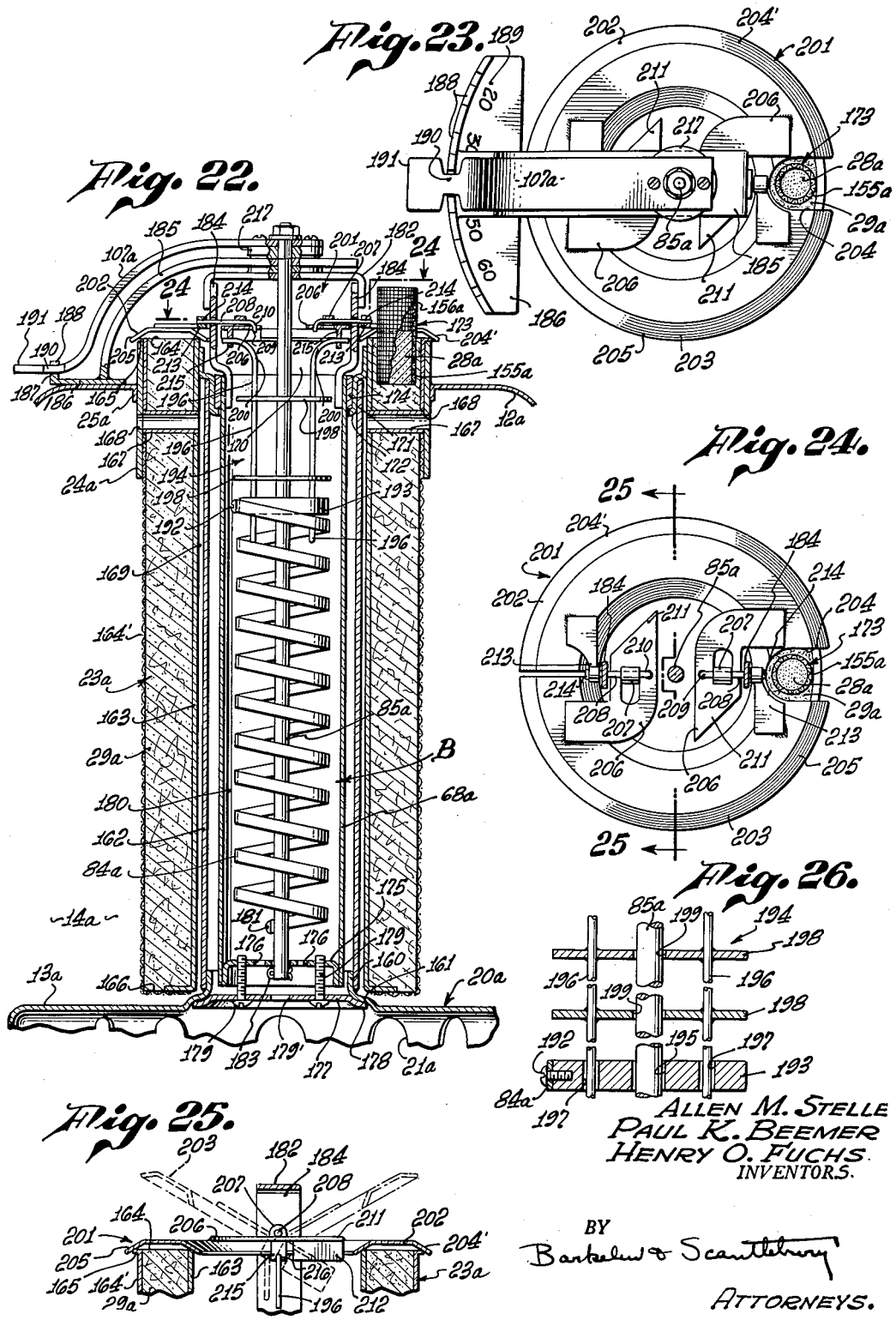

Sept. 13, 1955    A. M. STELLE ET AL    2,717,590
THERMOSTATICALLY CONTROLLED WICK TYPE HEATER
Filed Nov. 7, 1949    6 Sheets-Sheet 6
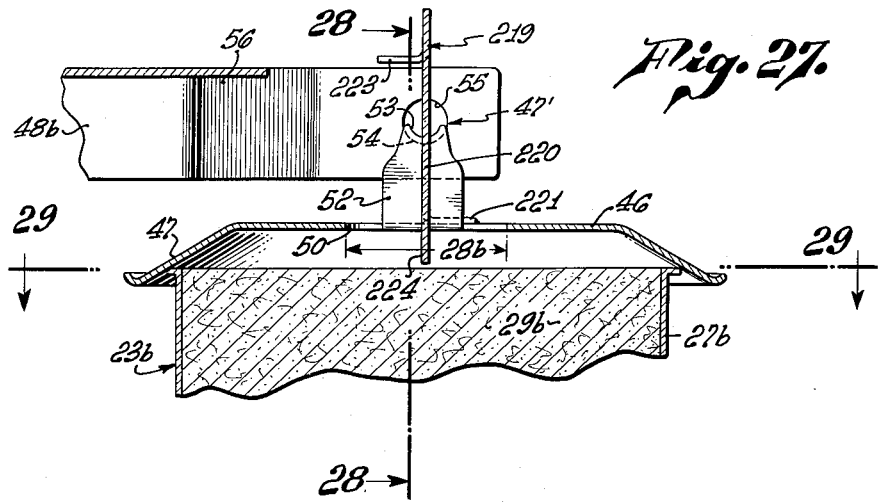
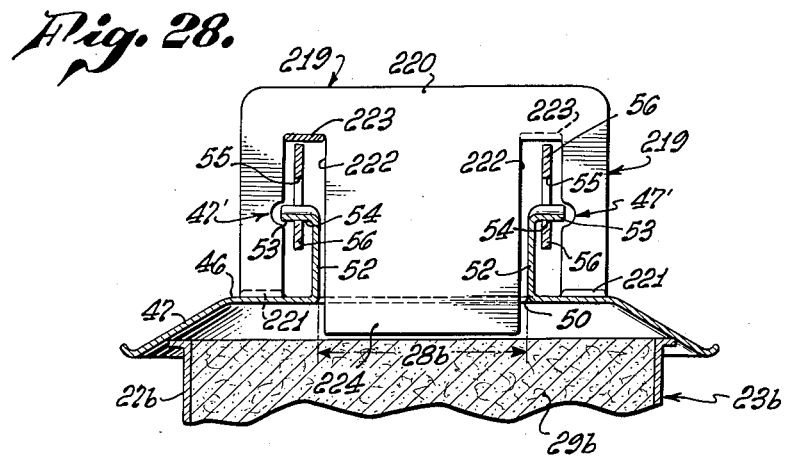
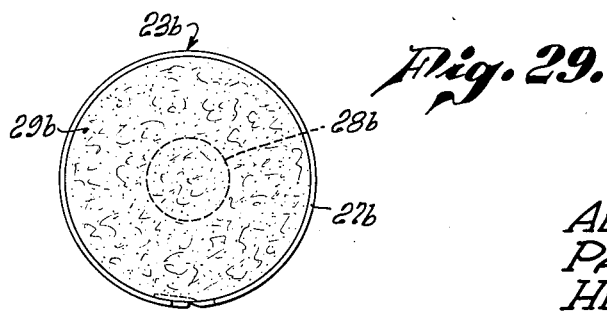
ALLEN M. STELLE,
PAUL K. BEEMER,
HENRY O. FUCHS,
INVENTORS.
BY Barkelew & Scantlebury
ATTORNEYS.

United States Patent Office 2,717,590
Patented Sept. 13, 1955

2,717,590

THERMOSTATICALLY CONTROLLED WICK TYPE HEATER

Allen M. Stelle, San Marino, Paul K. Beemer, Pasadena, and Henry O. Fuchs, Los Angeles, Calif., assignors to Preco Incorporated, Los Angeles, Calif., a corporation of California Application November 7, 1949, Serial No. 125,944

10 Claims. (Cl. 126—96)

This invention has to do generally with heaters and is more particularly concerned with thermostatically controlled heaters.

The heater, including its thermostatic control, is particularly well adapted to the heating of produce-containing railroad cars and trucks and we will therefore discuss certain phases of the invention as affected by that environment. Similarly, the invention in certain of its aspects is particularly well adaptable to heaters having wick-type burners, and the drawings and description are therefore directed to heaters of that type. However, it will be understood that such limitations in discussion, drawings and description are not to be considered as limitative on the broader aspects of the invention.

A heater used in produce-car heating is normally exposed to extremely severe service conditions and yet it must be promptly responsive to temperature changes—in other words it must be rugged and yet its thermostatic control must have a degree of sensitivity which usually demands mechanism of a delicateness which is unable to withstand severe service conditions. It is, of course necessary, no matter what the conditions may be (short of car-wreckage) that the heater be as nearly unfailing in performance as possible, for great economic loss may result from temperature conditions (high or low) which have deteriorative effect on such cargo. In this connection it is to be remembered that produce cars are inaccessible to attendants during relatively long periods of time so there is great opportunity for cargo-damage resulting from heater failure that would not occur were the heaters to be under constant observation and accessible for immediate repair or replacement upon discovery of a failure.

It is therefore among the major objects of our invention to provide a thermostatically controlled heater which is, throughout, sufficiently rugged and strong to withstand extremely severe service conditions, yet one which is relatively sensitive to surrounding temperature conditions and is, within all reasonable limits, unfailing in performance.

To this end, the heater and its controls are so devised that valves, floats and tubing connections, along with the operating and maintenance difficulties they inherently present, have been entirely eliminated. The structure, in general, is of a design largely eliminating dangers of explosion and fuel-spillage, and the regulatable thermostatic control has been simplified to a degree which not only holds its fabrication and assembly costs to a minimum, but also insures unfailing performance over long periods of time. Yet in spite of this simplicity, the requisite degree of sensitivity is maintained.

It is a further object of the invention to provide superior burner units and thermostatic units, per se, and to provide them in such form that, as units, they are readily and easily assembled with or disassembled from the other component parts of the heater.

It is also an object of the invention to provide a heater which, while the main burner is lighted, will generate and distribute heat in a highly efficient manner. In this connection, we have so associated the "snuffer" or flame extinguishing member with the main burner that the snuffer, when in inoperative position insofar as its snuffing function is concerned, plays a part in improving combustion conditions.

Divisional application entitled Thermostatic Control Unit, filed March 16, 1951, Serial No. 215,972, contains claims to the thermostatic unit, per se; and divisional application entitled Flame Snuffer for Wick Burners, filed March 16, 1951, Serial No. 215,971, contains claims to the flame snuffer, per se.

Other objects and features of the invention will be apparent from the following detailed description of illustrative forms of the invention, reference being had to the accompanying drawings, in which:

Fig. 1 is a longitudinal medial section through the body of the improved heater, a portion of the stack and certain elements within the body being shown in elevation;

Fig. 2 is a detail section on line 2—2 of Fig. 5;

Fig. 3 is a slightly enlarged, detail section on line 3—3 of Fig. 1;

Fig. 4 is a top plan view of the heater;

Fig. 5 is an enlarged medial section, partly in broken-away elevation, through the thermostatic control unit, with fragmentary showings of the supporting structure therefor, the section being taken in the plane of line 5—5 of Fig. 4;

Fig. 6 is a top plan view of Fig. 5; partly in broken away section;

Fig. 7 is a section on line 7—7 of Fig. 5;

Fig. 8 is an exploded view of a portion of a snap-over spring assembly which may be incorporated in the device;

Fig. 9 is a fragmentary elevation of the lower end of Fig. 5, as viewed from the right thereof;

Fig. 10 is a section on line 10—10 of Fig. 5, except that it shows the control crank arm and its operating rod moved to positions other than those they occupy in Fig. 5;

Fig. 11 is a view similar to Fig. 10 but showing the control mechanism in "off" position;

Fig. 12 is a section on line 12—12 of Fig. 5;

Fig. 13 is a section on line 13—13 of Fig. 5;

Fig. 14 is a detached view, partly in medial section and partly in elevation, of the burner unit of the device;

Fig. 15 is a top plan view of Fig. 14;

Fig. 16 is a section on line 16—16 of Fig. 5;

Fig. 17 is an enlarged fragmentary section on line 17—17 of Fig. 15, showing only details of the pilot tube assembly;

Fig. 18 is a section on line 18—18 of Fig. 17;

Fig. 19 is a view similar to Fig. 14 except that it shows a variational type of burner assembly;

Fig. 20 is a section on line 20—20 of Fig. 19;

Fig. 21 is an enlarged, fragmentary section through the upper portion of the wick and pilot tube assembly of Fig. 19;

Fig. 22 is a longitudinal medial section through a variational form of burner and thermostatic control element, showing, in fragmentary section, only the part of the heater body that supports said units;

Fig. 23 is a top plan view of Fig. 22, except that the showing of the body portion of the heater is omitted;

Fig. 24 is a section on line 24—24 of Fig. 22;

Fig. 25 is a fragmentary section on line 25—25 of Fig. 24;

Fig. 26 is a detached and longitudinally contracted view of a portion of the torque transmitting unit of the device;

Fig. 27 is a fragmentary section showing a variational form of burner cartridge and flame-extinguishing member;

Fig. 28 is a section on line 28—28 of Fig. 27; and

Fig. 29 is a reduced-scale section on line 29—29 of Fig. 27.

The improved heater is illustrated as made up of four readily assembled and disassembled units; the body portion or unit being generally indicated at 10, the self-contained thermostatic control at A, the burner unit at 23, and the stack or chimney unit at S.

In assembling the heater, burner unit 23 is first installed, then control unit A is mounted in proper association with unit 23, and finally chimney S is attached. Disassembly is, of course, accomplished in reverse order. When we later speak of inserting or removing a given unit, it will be understood that such of the remaining units as would otherwise interfere with the operations, have been detached from the body unit, or at least moved to positions of non-interference.

Body portion 10 comprises cylindrical shell 11, dome 12 and bottom 13, all connected in a rigid and leakproof manner, thus, in view of other structure to be described later, serving as a reservoir or tank 14 for liquid fuel 15, as, for instance, methanol. The dome is provided with a filling opening 16 and a cap 17 therefor, while bottom wall 13 is provided with a sump 18 and a plugged drainage opening 19. Bottom 13 is spaced upwardly from the lower or base end of shell 11 to define an air space 20 which is in communication with the surrounding atmosphere through openings 21. Thus, the lower end of thermostatic control unit A, to be described later, though supported within space 20, is exposed to temperature conditions prevailing about the exterior of the heater base.

The burner assembly, generally indicated at 23, is of cartridge form and is coaxial with shell 11, being removably suspended in a housing tube 24 welded to dome-neck 25 and opening to the atmosphere at a plane spaced slightly above the neck. An annular radiation shield 26 is applied to the upper end of tube 24, but that portion of the shield which overlies the tube 24 may be considered as, in effect, the upper end of that tube insofar as the cartridge-stop function of the tube is concerned.

Burner unit 23 comprises a substantially cylindrical jacket 27 of relatively light, resilient metal which retains a central pilot wick 28 and an immediately surrounding, annular, main-burner wick 29. However, jacket 27 is longitudinally split at one side and is pre-fabricated so, in the detached condition of Fig. 14, the lower extent of the shell material overlaps as at 30 (Figs. 14 and 16) while a V-shaped gap 31 is developed at the upper extent. An apertured end-plate 32 is fitted within the lower end of jacket 27, while the upper end of the jacket is outwardly flanged at 33.

The main wick 29 is preferably, though not necessarily, made up of a plurality of sections 34 of "non-charrable" wicking such as "glass fibre" or equivalent material presenting suitable capillary passageways. Sections 34 are pre-formed to approximate sectorial transverse cross-section (Figs. 15 and 16), the sections being of a length to extend substantially from end to end of jacket 27. In any event, it is desirable that the upper ends of the sections either be flush with the upper end of the jacket or be not more than about 1/16" therebelow.

The innermost surfaces 35 of wick sectors 34 are arcuate and thus, in the aggregate, define a bore to take pilot wick 28 and the pilot-wick tube 36. Though this is not at all limitative on the broader aspects of this portion of the invention, the tube is advantageously made up of a series of arcuate sections 37 of thin stainless steel connected in a manner to define bore 38 of a diameter nicely to take cylindrical pilot wick 28; the latter preferably, though not necessarily, being made up of material such as is used for the main wick, but pre-formed as a cylinder.

The arcuate sections 37 are each provided with a relatively short, substantial radial extension 39 and a relatively long, substantially radial extension 40, the short extension of one section being brazed or otherwise secured to the long extension of the adjacent section, as clearly indicated in Fig. 18. The extensions 40 represent, in effect, radially extending positioning plates or blades, the extensions lying between adjacent wick sectors 34 and being of such radial length as to serve, at least approximately, to center the wick tube with respect to jacket 27 independently of main wick 29.

Sections 37 define a full bore from top to bottom of extensions 39 to 40, but from the top of the extensions they are fabricated to define a substantially conical pilot burner tip or dome 41. The upwardly and inwardly curved tube-tongues 42, arcuate in transverse cross-section, which make up this tip are spaced apart edgewise to provide elongated orifices or burner slots 43 extending longitudinally of the dome and commonly opening to form, in effect, a central tip-orifice 44.

Pilot wick 28 extends upwardly into the tip-chamber 45, the extent of projection desirably, but not necessarily, being of the order of 1/8" when the tip chamber is of a total height of about 7/8". The lower end of the pilot wick may be slightly spaced from jacket-end 32.

With the burner "cartridge" in the condition of Fig. 14, it is thrust bodily through tube 24, the tube diameter being such that, during this movement, the upper end of jacket 27 is radially contracted, as allowed by gap 31, thus radially compressing the assembly of main-wick sectors 34 and clamping blades 40 and pilot wick 28 in a manner to prevent subsequent accidental dislodgment of either the wick or the tube 36.

When the burner cartridge 23 is thrust home, as determined by the engagement of flange 33 with the top of tube 24, the lower end of the cartridge is spaced slightly above reservoir bottom wall 13 so fuel 15 may enter the apertures of cartridge-end 32 and be fed by capillary action to the top or burner surfaces of wicks 28 and 29.

Jacket 27, near its upper end, is preferably depressed to form an annular channel 57 which is in register with openings 58 (Figs. 1 and 14) in the wall of housing tube 24. The wall of the channel is pierced at 59, it following that the interior of the upper end of sleeve 27 is in communication with the reservoir 14 at a point above any expected fuel level. This venting arrangement prevents pressures built up in the reservoir above the fuel level (as, for instance, may be caused by thermal conditions) from forcing liquid fuel up through the wicks to the combustion surface and thus losing the benefit of capillary feed and flooding the burner.

It may be pointed out that unit 23 is adapted to function as a safety valve, for if excessive pressure starts to build up within tank 14 the cartridge will be expelled from tube 24 to relieve that pressure before it becomes explosive in magnitude. Of course, such mechanism as lies in the path of the cartridge will be damaged but this is a minor factor compared with damages due to rupture of the body member by explosion.

Before considering the thermostatically responsive mechanism for controlling the burner of the heater, it will be advantageous first to consider the generalities of the snuffing member or flame extinguisher which is actuated by that mechanism. Without going into the details of the snuffer mounting, it may here be pointed out that the snuffer comprises an annulus 46 having a downturned outer peripheral flange 47 (Figs. 5 and 6) or, more generally, the snuffer may be considered as a centrally-apertured and upwardly dished plate. The annulus is pivotally mounted at 47' on an arm 48 of inverted channel cross-section. The arm, in turn, has pivotal mounting on shaft 49 which is fixed with relation to burner cartridge 23, a shaft whose location will be more definitely established later on.

Annulus 46 is supported by arm 48 so bore 50 is in axial alinement with pilot burner tip 41, the bore being of a diameter to take that tip, with suitable working clearance, when the snuffer is vertically reciprocated. In the dotted line position of Figs. 1 and 5, annulus 46 lies directly on flange 33 of jacket 27, thus covering the upper end of main burner wick 29 and maintaining the main burner extinguished. However, the pilot tip 41 projects through annulus bore 50 and therefore the pilot flame may remain unextinguished even though the snuffer be down. When a temperature drop subsequently causes arm 48 to elevate annulus 46, the upper end of wick 29 is re-exposed and the fuel fed to the main burner is re-ignited by the pilot flame. In its upper position, the extinguisher 46 acts as a hood spaced above the main burner and serves, among other things, efficiently to spread and divert the main burner flame and the heat generated thereby.

It is desirable that the vertical space between the main burner and the outer periphery of annulus 46, acting as a hood, be substantially uniform when the main burner is in operation, so the delivery from the annular combustion "mouth" 51 may be uniform throughout its full peripheral extent. This is accomplished by providing for the pivotal mounting of annulus 46 on arm 48 and by hanging the annulus with its center of mass below the pivot point. The pivotal mounting also allows annulus 46 to self-adjust itself to an even seating on flange 33. While this pivotal connection may be of any suitable type, we have here shown an arrangement particularly well adapted to the purpose both from the standpoint of fabrication and operation. Vertical ears 52 are struck up from the annulus 46 immediately adjacent bore 50 and are then bent horizontally and radially outwardly to form pintles 53, the horizontal extents being formed with arcuate, transverse cross-sectional contour, as clearly shown in Fig. 5 at 54, so as to ride smoothly in the apertures 55 provided in the fork arms 56 which are integral with and may be considered as parts of main arm 48.

The regulatable means for thermostatically controlling annulus 46 (alternately functioning as an extinguisher and a re-lighter for the main burner) will now be described. This means, along with arm 48 and annulus 46, is mountable and dismountable as a self-contained unit A.

Housing sleeve 60 is supported by body 10 and extends vertically between and through dome-neck 61 and bottom-wall neck 62, the joints between sleeve and necks being hermetically sealed. The lower end 63 of the sleeve projects into air space 20 and terminates in a cap-spider 64. The upper end 65 of the sleeve extends above dome 12 and serves as a support for unit A, as will appear.

Unit A includes a housing generally indicated at 67; made up of cylindrical jacket 68 (Figs. 5 and 7) and the generally rectangular shell 69 which is in the form of an inverted channel member having a top wall or web 70 and vertical side walls or flanges 71. Side walls 71 have segmental horizontal flanges 72 welded at 73 to jacket 68, and it is these walls which support pivot-shaft 49, previously spoken of, whereby arm 48 is mounted for swinging movement. Walls 71 extend chordally beyond jacket 60 (Fig. 11) and are connected at one side of the jacket by the end wall 74 which is arcuate as viewed in plan, the lower edge of wall 74 having a struck-up ear 75 to act as an arm stop. Horizontal scale-plate 76 is integral with wall 74 and carries scale marks or calibrations 77 (Fig. 6). The marks indicate temperatures at which the thermostat, to be described, may be selectively regulated to actuate snuffer 46. Scale-plate 76 has a vertically extending latching flange 78 provided with alternate notches and projections 79 and 80, respectively, corresponding with certain of the marks 77, this flange being arcuate, as viewed in plan, and being concentric with respect to jacket 68. At one end of the flange 76 is a stop lug 81, projecting higher than do projections 80 (Fig. 12) while at the other end of the flange is an "off" projection 82 of the same height as, but of greater arcuate extent than, projections 80. At the outer end of and extending above projection 82, is arranged a stop member 83 secured to a side wall 71 at 83'.

The lowermost end of tube 68 houses the bi-metallic, coiled-band type of thermostatic element 84 (Figs. 5 and 13) having the resilient qualities usual to such elements. The inner end of the coil is operatively connected to actuating rod 85 by extending it through rod-slot 86 which opens to the bottom of the rod. The outer end of the coil is reduced slightly in width to form a tab 87 which is turned angularly through the relatively wide jacket-slot 88 and through the relatively closely fitting slot 89 in one of the legs 90 of calibration adjustment member or yoke 91. The legs 90 fit the jacket 68 at diametrically opposite sides thereof, while the stirrup portion 92 of the yoke is spaced below the end of jacket 18 and freely admits air from chamber 20 to the bore of the jacket and, of course, to the spaces between the coils of element 84. The stirrup has horizontally spaced vertical flanges 93 (Figs. 2 and 5) and has horizontal shoulders 93' which limit the downward movement of the thermostat element 84. Legs 90 have horizontal slots 94 through which attachment screws 95, threaded into jacket 68, extend. After loosening screws 95, member 91 may be rotated (within the limits established by the circumferential extents of slots 88 and 94) to act on thermostat tab 87 and hence on the entire element 84 in a manner to rotate rod 85 and the elements carried thereby. This mechanism is used for setting the thermostat to the calibrations 77, as will appear.

The jacket 68 is preferably pressed in at the side opposite tab 87 to form elongated lugs 96 which hold element 84 against excessive bodily side shift such as might clear tab 87 from slot 89.

Thermostatic coil 84, through its association with the jacket 68 and stirrup 92, supports rod 85 from its lower end. The upper end of the rod has universal joint connection 97 (Fig. 5) with the socketed boss 98 carried by disk 99. Stirrup 92 opposes the head 100 which is secured to the lower end of rod 85 to pinch the slotted rod about the coil end 86 and thus retain the coil in position. Stirrup 92 prevents rod 85 from dropping a sufficient distance to disengage the ball and socket joint 97 in the event the stiffness of the coil is insufficient to hold the rod up. The stirrup and its flanges also limit the transverse movement of the lower end of the rod, but the limitation is not close, for head 100 has fairly free capacity for bodily transverse displacement.

Disk 99 is mounted for rotation with respect to housing portion 69 by reason of its particular mounting in top wall 70. Said wall is provided with a bore 101 which is concentric with jacket 68, and from this bore there extend diametrically opposite notches 102' (Fig. 7). Disk 99 has a portion 102 adapted to have rotational bearing in bore 101, ears 103 extending radially from bearing portion 102 and lying just beneath housing-top 70. Above the plane of wall 70, the disk has a diametrically enlarged portion persenting an annular flange 104 spaced from ears 103 by the common thickness of wall 70 and disk portion 102. This disk is assembled with the housing by rotating it 90° from the position of Fig. 7, lowering it until portion 102 enters bore 101 and then rotating it to bring ears 103 out of register with notches 102', the ears and the flange 104 thereafter holding the disk from vertical displacement but allowing its rotation. The limit of rotation of the disk during operation of the device is such that the ears 103 cannot accidentally move back into register with notches 102'.

Depending boss 98 is integral with but eccentrically located on disk 99 (Figs. 5, 7 and 12). Integral with and upstanding from disk 99 is an eccentrically arranged lug 105 supporting a cross pin 106 which provides a pivot for regulating handle 107. The handle is formed as an inverted channel having top wall 108 and side walls 109, the pivot pin 106 extending through said side walls, the latter taking lug 105 nicely between them.

Handle 107 has at one end a pointer-portion 110 which is pinched down, as viewed in plan (Fig. 6) to be of a width to be taken nicely in regulation-setting notches 79 and yet to leave side walls 109 sufficiently spread to take regulation-setting projections 80. Thus, the handle may be held against rotation in a number of settings equal to the sum of the number of notches and projections. The top wall of the handle at its other end is provided with a thumb pressure pad 111 beneath which is mounted an expansion spring 112 adapted to bias the handle in a counterclockwise direction, thus tending constantly to engage the pointer 110 with the setting notches or projections. Lug 113, upstanding from disk 99 and having sliding fit between side walls 109, takes a part of the load in the transmission of torque from the handle to disk 99.

Since coil 84 yieldably tends to hold the lower end of rod 85 approximately centered with respect to jacket 68, and since the upper end of the rod is mounted in disk-socket 98 which, in all its positions of adjustment, is eccentric with relation to the jacket, it will be seen that rod 85 is always inclined with respect to the longitudinal axis of the jacket.

It will be obvious that by depressing the thumb pad end of the handle, pointer end 110 will be cleared from the setting formations 79 and 80, whereupon torque applied to the handle rotates disk 99 and, due to the eccentric location of hub 98, bodily translates the upper end of rod 85 from, for instance, the position of Fig. 10 toward that of Fig. 11. Release of pressure from pad 111 allows spring 112 to engage the pointer with the newly registering setting formation, thus latching the disk 99 and rod 85 in their new positions of adjustment.

The formation of that portion of arm 48 which lies within housing 69 will now be described. The arm is there widened, its edges being downwardly turned to provide flanges 114 which fit, with working clearance, between the housing walls 71. Pivot shaft 49 passes through those flanges. The widened portion 115 of the arm is centrally cut away to form arms 116 and 117 connected at their ends by cross bar 118, a counterweight 119 being crimped to the latter. Housing ear 75 is positioned beneath counterweight 119 to act as a stop limiting the counterclockwise movement of arm 48, as viewed in Fig. 5, and thus establishing the height to which snuffer 46 is elevated above the main burner when the latter is in full operation. Weight 119 substantially counterbalances the longer portion of arm 48 and the snuffer annulus 46, rendering the snuffer substantially non-responsive to vertical acceleration.

Ears 120 and 121 are struck upwardly from arms 116 and 117, respectively, the ears being substantially in vertical alinement with pivot 49 when arm 48 is exactly horizontal. Ear 120 serves as a stop for arm 48 under a "shut-off" setting of handle 107, as will later appear, while ear 121 functions as a crank arm in the operative connection between rod 85 and arm 48.

Secured to rod 85 at a point above arm 48, is crank arm 122 (Figs. 5 and 10 to 12) whose distal end is connected to crank arm 121 by link or connecting rod 123. The point of pivotal connection 124 between crank 121 and connecting rod 123 lies substantially in the vertical axial plane of pivot 49 when arm 48 is exactly horizontal. Crank 122 is extended at the opposite side of rod 85 to form a stop lug 125 which, in the shut-off position of adjustment of rod 85 engages lug 120 to positively hold arm 48 and snuffer 47 down.

In considering the showing of Fig. 10, it is to be remembered that, as stated in the brief description of the figure, rod 85 is shown as shifted to a position of regulation other than that it occupies in Fig. 5, for, with rod 85 in the position of Fig. 5, crank 122, as viewed in plan, is normal to the axis of arm 48.

Though not essential to the operation of the above described mechanism and therefore not to be considered as limitative on the invention, it is sometimes of advantage to provide means for snapping arm 48 to fully elevated or fully depressed positions as pivot point 124 passes through the vertical axial plane of pivot 49 during actuation of crank 122 by thermostatic rotation of rod 85 under circumstances to be described. We have devised a particularly efficient and simple snap-over mechanism for this purpose, as disclosed particularly in Figs. 5 and 8. A formation adapted to function as a snap-spring anchor, fixed with respect to housing 69, is illustrated in detached aspect in Fig. 8 and is generally indicated at 126. This anchor includes arms 127 connected by bridge 128 and from one of which arms there extends a member 129 having an attachment tab 130 extended through housing-top 70 as at 131 (Fig. 7). Arms 127 are notched at 132 to take pivot shaft 49, said shaft acting to support the anchor. Bridge 128 is pierced at 133 to receive the tab 134 of snap-over, loop-spring 135 which, in Fig. 8, is shown in unstressed condition. The tab 136 at the other end of the spring loop is adapted to be engaged with ear 137 (Fig. 5) punched down from the web portion of channeled arm 48.

Spring 135 is installed in stressed condition as shown in Fig. 5, functioning resiliently to hold arm 48 either in the full line or dotted line position of that figure. As will later appear, the reaction of coil 84 to changing temperature conditions builds up forces which finally become of sufficient magnitude to overcome the opposing force of spring 135; and the arm 48 with its annulus 46 is snapped from full line position to dotted line position, or vice versa. Shaft 49 is stationary and does not swing with arm 48; so that the pressure of member 126 against it does not impede the arm action.

With stack S removed, unit A is lowered into housing sleeve 60, coming to rest with the lower edges of walls 71, where they extend beyond jacket-tube 68, engaging the upper end of sleeve 60. The segmental flanges 72 of housing 69 have down-turned, diametrically opposite lugs 138 which are radially spaced from tube 68 (Fig. 12) and fit nicely within the bore of sleeve 60, thus serving to annularly space jacket 68 and sleeve 60. Sleeve-carried screws 139 (Figs. 1, 4 and 6) are threaded through lugs 138 to hold the unit A releasably within sleeve 60 and in fixed location with respect to the other units of the heater. For instance, the unit is thus positioned so snuffing annulus 46 is held substantially coaxial with burner cartridge 23 and so, during the rise and fall of the annulus, pilot tip 41 is taken within annulus bore 50 in the manner previously described. The described coaxial setting of jacket 68 in sleeve 60 establishes between them a vertically extending annular space 140, the space opening to the atmosphere at its upper end 141 (Fig. 5) and, in effect, opening at its lower end to chamber 20, access being had between the arms of spider 64 and through sleeve-ports 142. The exterior of thermostat jacket 68 is thus exposed, throughout its length, to the temperature conditions of the air surrounding the heater, with obvious advantage. It is also to be noted that the upper end of the bore 142 of jacket 68 opens to the atmosphere through the housing shell 69, so that air can move through the jacket and past the thermostatic element 84.

It will now be assumed that snap-over spring 135 is omitted from the assembly. Before proceeding to a detailed discussion of the calibration and regulation of the thermostatic element, it is first to be noted that, with the upper end of rod 85 fixed against translation, a rising temperature applied to thermostatic coil 84 causes that coil to uncoil or tend to uncoil, thus rotating or tending to rotate rod 85 and crank arm 122 in a counterclockwise direction (Fig. 10) thrusting on connecting rod 123 and crank arm 121 in a manner tending to swing arm 48 in a clockwise direction from the full line position of Fig. 5 to the dotted line position to lower the snuffer. On the other hand, a decreasing temperature applied to coil 84 acts reversely, that is, it tends to swing arm 48 in a counterclockwise direction to raise the snuffer.

It will have been predetermined that, with the thermostatic coil 84 in equilibrium, and the upper end of rod 85 held against translation, it requires a rise or fall of a given number of degrees or a fraction of a degree in temperature to rotate rod 85 about its axis sufficiently to swing arm 48 from either the full line or the dotted line position to a midway position. We will call this predetermined extent of rise or fall in temperature the "operating differential."

In order to explain the setting, regulation and operation of the thermostatic control, it will be assumed that unit A is detached from the heater, that snap spring 135 is detached from the assembly, and that certain steps are taken that, actually, are taken only during the initial preparation of a given unit for service, and certain other steps taken that, actually, may be taken only in establishing calibrations which are thereafter reproduced as standard for all thermostatic controls of like structure. It is, of course, to be remembered that the particular procedures described are given by way of example, only, and are not at all to be considered as limitative either on the practices which may actually be put into effect or on the invention.

It will be assumed that regulator handle 107 is set at a point representing 32° F. on calibrations 77, it resulting that arm 85 and crank arm 122 are approximately in the positions of Fig. 11, except that they will be further to the left so that definite clearance exists between stop 120 and lug 125. It will also be assumed that screws 95 are loosened.

The thermostat coil 84 is then exposed to a temperature of 32° F., as by immersing it in a water bath of that temperature. It will have been predetermined when the above conditions prevail, the thermostat tab 87 will lie in such relationship to the side walls of jacket-slot 88 that it is susceptible of the following operation. Yoke 91 is bodily rotated to shift tab 87 horizontally and thereby, through coil 84, to impose torque on rod 85 sufficient to swing crank 122 in a clockwise direction (Fig. 11) through such an angle that, through connecting rod 123 and crank 121, arm 48 and annulus 46 are moved to a position of equilibrium; that is, midway between the full and dotted line positions of Fig. 5. Screws 95 are then tightened and, as a precaution, solder 143 may be applied to the screw and leg 90 to prevent the thermostat from subsequently getting out of adjustment.

If, now, the water bath be lowered in temperature, coil 84 reacts in a manner to rotate rod 85 clockwise (Fig. 11) swinging crank 122 clockwise and, through link 123, swinging arm 48 counter-clockwise, thus raising annulus 46 to the full line position of Fig. 5. The operating differential necessary to accomplish this movement is very slight, say about 1° F.

Now assume that, with the regulator still set at 32° F., the temperature of the water bath rises above 32° F. by an amount equal to the operating differential. Thermostat coil 84 will respond in a manner to rotate rod 85 in a counter-clockwise direction (Fig. 11) thus, through crank arm 122 and connecting rod 123, rotating arm 48 in a clockwise direction (Fig. 5) and depressing annulus 46 to the "snuffing" position indicated by dotted lines in Figs. 1 and 5.

If the temperature of the water bath is allowed to continue to rise, with the setting still at 32° F., arm 48, having reached its limit of clockwise rotation, acts through crank 121, link 123 and crank arm 122 to prevent further counter-clockwise rotation of rod 85. Accordingly, the thermostat coil, in its effort to seek its positions of equilibrium for the higher and higher temperatures to which it is being progressively exposed, becomes stressed to correspondingly greater degrees.

The stress thus built up in the thermostatic coil 84 can be controllably relieved by allowing the upper end of rod 85 to move bodily through predetermined extents to the left from the position of Fig. 11, or, in the example now under particular consideration, from its initial position as established by the 32° F. condition of the coil. Accordingly, if we wish to determine and mark any particular position of the regulating means which will correspond with some higher temperature at which we choose to have the snuffer rise to equilibrium position, we may proceed as follows.

The water bath is raised to and held at a selected temperature for which we are to set the regulator. The upper end of rod 85 is then manually moved bodily to the left, thus progressively relieving the built-up stress in the spring coil and thus correspondingly lessening the effective pressure which is tending to hold arm 48 from swinging in a counter-clockwise direction. The left-wise movement of the upper end of the rod is continued until arm 48 and annulus 46 are in equilibrium condition, and the setting of the regulator is marked on scale plate 76. If this setting be held and the temperature of the thermostatic coil be lowered by an amount equal to the "operating differential" rod 85 will be rotated about its axis in a clockwise direction (Fig. 11) and thus swing arm 48 in a counterclockwise direction sufficiently to carry annulus 46 to the full line position of snuffing of Fig. 5.

From such procedures, or by calculations based on the known response-characteristics of element 84, scale 77 is arrived at, which, of course, is duplicated on all thermostats having the same characteristics, and may include any appropriate number of individually marked settings between the limits determined upon.

If the snap-over spring 135 be installed after the device has been adjusted and calibrated as above, it will, of course, prevent the arm 48 and annulus 46 from dwelling in equilibrium positions, that is, positions mid-way between the full and dotted line positions of Fig. 5. Since the thermostatic coil 84 must overcome the force of spring 135 in order to actuate the snuffer, the value of the "operating differential" will be slightly increased. On the other hand, the snap-over action has the advantage of preventing the arm 48 from hovering in equilibrium condition and thus from being susceptible to extraneous forces which might otherwise cause undesirable suffer-movement.

It will be seen that regulation of the thermostatic control may be considered broadly as being accomplished by translation of the upper end of rod 85 while the distal end of crank 122 is restrained from movement in the same direction. In the illustrated case, this translation is in a direction generally parallel to the plane of movement of crank arm 121, but this is not to be considered as limitative on the invention.

However, it will be seen that it is not necessary that the translation be exactly parallel to the plane of crank-movement, for it suffices if the direction of movement of the upper end of the rod has a sufficiently large component parallel to that plane to give the desired regulation range; and the fact that the direction of movement may have other components does not necessarily interfere with the operation of the device. We have taken advantage of this fact in developing the exceedingly simple and sure regulation means which is here illustrated and the elements of which have been described.

Assuming the device is in the condition of Fig. 10, if regulating handle 107 be rotated in a clockwise direction, as viewed in Fig. 4, disk 99 is, of course, rotated in the same direction, causing the eccentric boss 98 to follow the arcuate path 144, carrying the upper end of rod 85 with it, the link connection 123 holding the distal end of crank 122 against appreciable bodily movement while this is occurring. As is apparent, the direction of movement represented by arc 144 has a sufficiently extensive component of movement parallel to the plane of the direction of movement of crank arm 121, to permit an appreciable range of regulation. It will be seen that it is unnecessary to provide slideways or close-fitting guiding elements usual to translation-control mechanism, thus avoiding the expense and the installation and operating difficulties of such usual mechanisms.

Crank 122 is, of course, very close to the upper end of the relatively long rod 85, and the lower end of the rod, where it is supported by coil 84, may be left free to have the slight bodily movement incident to translation of the upper end of the rod during regulation operations. However, the side arms of stirrup 92 and flanges 93 protect said lower end and prevent accidental excessive bodily displacement thereof.

If pointer 110 be swung to the "off" position on the scale 77 (Fig. 6) the upper end of rod 85 is moved to the position shown in Fig. 11, where lug 125 on crank 122 engages stop lug 120 on arm 48, holding that arm so snuffer 46 is held depressed in its lowest position. Then, no matter how low the temperature may drop, clockwise rotation of rod 85 and crank 122 is prevented by the engagement of lug 125 with stop 120 and the coil 84 is thus ineffective to elevate the snuffer.

Upstanding from and welded to dome 12 are several angularly-spaced flanges 145, each substantially V-shaped as viewed in plan (Fig. 4) one of which forms a protector for filling cap 17. The lower end of stack S is detachably bolted at 146 to flanges 145, said end thus being supported concentric with but spaced vertically above cartridge 23. A protective band 147 for the top of unit A is secured directly to the stack. An interior annular baffle 148, interrupted at 149 for the admission and play of arm 48, is supported at the lower end of the stack, the baffle inclining inwardly and downwardly as viewed in vertical section so its lower edge 150 is approximately at the level of and annularly spaced fairly closely to the snuffer 46 when the latter is fully elevated.

Stack S is provided with louvres 151 (Figs. 1 and 3) which open downwardly and outwardly below the upper end of the stack which is capped at 154; and with a bail 152, and a sliding access gate 153 which is openable to permit inspection of the burner and lighting or extinguishment of the pilot.

From all the above, the operation of the heater will be apparent. Assuming the temperature of the air surrounding the heater is lower than that to which the thermostat control is currently regulated, snuffer 46 will be in the full line positions of Figs. 1 and 5, and the pilot and main burners will be lighted. The burning gases and the heat generated thereby are evenly distributed through annular mouth 51, air from the exterior of the heater entering the combustion chamber and the stack via the space between dome 12 and stack-baffle 148. The snuffer annulus 46 is directly in the path of the main burner flame and serves as a hood evenly spreading and distributing the gases of combustion. Furthermore, the hood, being directly exposed to main-burner flame, radiates its heat back to the wick surface and thereby causes more rapid vaporization of the methanol, to obvious advantage.

In Figs. 19 through 21, there is shown a variational embodiment of pilot wick support and pilot burner tip. The jacket 27 and wicks 28 and 29 may be just as previously described in connection with Figs. 14 through 16, but here the pilot wick support and pilot burner tip comprises a tubular screen 155 which is centered with respect to the assembly of main-wick sectors 34. The open-ended screen extends from a point appreciably above the top of main burner wick 29 to a point approximately midway of the length of pilot wick 28, the upper end of the pilot wick 28 projecting above wick 29 to an extent previously specified in connection with Fig. 14. The portion 156 of screen 155 which extends above wick 28 may be considered as the pilot burner tip of assembly 23.

In order to hold the pilot wick and screen 155 against accidentally dropping, one with respect to the other or with respect to main wick 29, there are provided cross-pins 157 which are thrust through the pilot wick and screen 155 and whose ends are at least partially embedded in the main wick sectors 34 when they are assembled about the screen prior to their entry to jacket 27. Then, when the assembly is radially compressed by thrusting the jacket into tube 24, as has been described, not only is the screen 155 clamped by the radial pressure of sectors 34, but pins 157 are fully embedded in said sectors to hold the screen and pilot wick from being pressed downwardly through the main wick bore in the event the radial compression on the main wick should be lessened for any reason.

In Figs. 22 through 26, there is shown a variational embodiment wherein the burner unit is in the form of an annulus and the thermostatic control unit is, in effect, nested within the annulus bore. The units differ in certain particularities from those previously described but are, in principle, alike in other regards.

In Fig. 22 the tank structure is shown only fragmentarily, but it will be understood it may, for instance, be generally similar to the structure shown in Fig. 1. Parts of Fig. 22 which correspond generally to those of Fig. 1 will be given the same reference numeral plus the subscript "a," and such of the earlier description as may apply in full to the variational embodiment, will not be repeated.

The dome and the bottom wall of tank or reservoir 14a are indicated at 12a and 13a, respectively, the dome having a central, downturned neck 25a and the bottom wall having a central upturned neck 160 which has a horizontal shoulder portion 161. A relatively short housing sleeve 24a is extended through and welded to neck 25a, the sleeve projecting somewhat above the top of dome 12c. The lower end of an inner housing tube 162, annularly spaced from tube 24a, is welded to bottom-neck 160, while its upper end is about flush with the top of dome 12a.

Adapted to be removably inserted in tank 14a through the annular space between housing tubes, is an annular, cartridge-form burner assembly or unit 23a. The cartridge includes inner and outer tubular walls 163 and 164', respectively, spaced radially apart to receive between them the main burner wick 29a, which may be of the nature previously described. The top face 164 of the annular body of wicking is substantially flush with the tops of walls 163 and 164'. Outer wall 164' is apertured at least in that portion which extends below tube 24a, so the wick is exposed to the fuel within tank 14a. External flange 165 on cartridge wall 164' engages the upper end of housing tube 24a to establish the limit to which the cartridge may be thrust into the tank. The lower end of the wicking space is bridged by apertured end wall 166, while tubes 167 extend transversely through the wicking space and are secured to walls 163, 164' near their upper ends. These tubes 167 register with openings 168 in tube 24a to equalize the gas pressure above the fuel level, as existing, on the one hand, outside the tube 24a, and on the other hand, in the upper portion of the annular space 169 between tubes 162 and 163. This prevents pressures which may be built up within the tank by reason of relatively high temperature conditions, from forcing liquid fuel up space 169 and over the top of tube 162.

A ring 170 is welded within the upper end of cartridge-wall 163, being bent inwardly to form a flange 171 fitting within housing tube 162, and then being bent horizontally to form an internal annular shoulder 172.

Thrust into the upper end of main wick 29a is pilot burner 173 made up, as in Fig. 21, of a tubular wire screen 155a whose upper end 156a projects well above main wick 29a. Screen 155a is filled with wicking 28a to a point a short distance above surface 164 of the main wick. The pilot wick is, in effect, a part of the main wick, fuel being supplied to it via the main wick.

The thermostatic control unit B is bodily movable into and out of operative association with the burner assembly. The housing structure whereby this is accomplishable will first be described, without regard to the contained mechanism, it merely being noted at this point that when that housing structure is releasably clamped in assembly with the other heater units, all parts of the burner and control units are releasably held in register with one another in the positions of Fig. 22.

Sleeve 68a has an external collar 174 at its upper end which fits within the bore of ring-flange 171 and is seated on annular shoulder 172. Welded to the lower end of sleeve 68a is an end plate 175 which is apertured at 176. After the sleeve 68a is lowered to position, lock-disk 177 is applied across the bore of the lower neck 160, with the disk-flange 178 in engagement with shoulder 161, and screws 179 are extended through disk 177 and threaded into end plate 175. The screws draw sleeve 68a downwardly to tightly engage collar 174 with shoulder 172. This action, in turn, draws burner-cartridge flange 165 into tight engagement with the top of tube 24a, it following that screws 179 act to tightly clamp both the burner unit and the control unit against axial or rotational displacement.

Locking disk 177 is apertured at 179′, so air surrounding the heater and entering base-chamber 20a through openings 21a, may pass through plate openings 176 into the bore 180 of jacket 68a, within which bore the thermostatic element 84a is disposed. Element 84a is a bi-metallic member of the resilient, open coil type, the lower end thereof being fixed at 181 to rod 85a. Rod 85a is mounted for rotation in end plate 175 and bridge 182, cotter key 183 holding the rod against displacement upwardly through jacket 68a. Bridge 182 is rigidly held in spaced, vertical relation with sleeve 68a by post straps 184.

Secured to the upper face of bridge 182 is a bracket arm 185 which supports at its lower end a scale-plate 186, carrying an arcuate flange 187 centered on rod 85a and provided with notches 188. The scale-plate preferably rests on dome 12a when unit B is assembled with the heater, and the notches are scaled with temperature indicia, as at 189.

Applied to the upper end of rod 85a and adjustably fixed against rotation with respect thereto at 217, is a regulating handle 107a which has sufficient vertical resilience to tend to press its neck 190 into any notch 188 with which it may register. On the other hand, extension 190 may be sprung upwardly to clear the neck from a given notch, and the handle 107a then swung horizontally to rotate rod 85a to a position where the neck will register with some other selected notch. Of course, when the neck rests in any one of the notches, the rod 85a and the lower end of coil 84a are held against rotation.

The upper end of coil 84a is secured at 192 to anchor ring 193 which is operatively associated with the torque-transmitting unit indicated at 194, rod 85a being taken, with clearance, in the bore 195 of the ring (Fig. 26). The torque-transmitting unit also includes rods 196 which are extended, with slidable clearance, through the diametrically opposite holes 197 provided in ring 193. Rods 196 extend through and are welded to vertically spaced disks 198. The disks are centrally apertured at 199 to take rod 85a with working clearance, and they serve not only as rod-connectors, but also as radiation shields. The upper ends of rods 196 are bent outwardly to form torque arms 200, said arms extending oppositely and radially with respect to rod 85a.

It will be seen that torque-transmitting unit 194, and rod 85a are relatively angularly and axially movable; that unit 194 and ring 193 (and the attached coil 84a) are relatively vertically movable; but that unit 194 is fixed against rotation with respect to ring 193. Consequently, torque applied to ring 193 by rotation of rod 85a or by the reaction of bi-metallic coil 84a to temperature changes, tends to rotate unit 194 about the axis of rod 85a and thus carry torque arms 200 bodily through circumferential paths. The axial expansion and contraction of coil 84a does not interfere with this movement, due to the capacity for relative vertical movement between ring 193 and rods 196.

The snuffer or extinguisher (also functioning at times as a re-lighter) is generally indicated at 201 and, in effect, is a split annulus made up of two semi-circular segments 202 and 203, the annulus being of such dimensions that when in assembly with the thermostatic control and the burner unit, it fits over the upper end of main wick 29a except at 204 where the opposed edges of segments or leaves 202, 203 are cut away to provide a slot for the reception of pilot 173. The annulus 201 has external and internal flanges 204 and 205 which incline downwardly and oppositely outwardly, giving each segment cupshaped, transverse cross section. Flanges 204 and 205 are adapted to engage the upper ends of cartridge-walls 163 and 164 when the main burner is "off."

The individual fabrication, mounting and operation of the segments 202 and 203 are the same, and therefore the detailed description may be limited to but one of them, though corresponding parts of the two segments are given the same reference numerals so the description will commonly apply. Welded to each snuffer segment is a flat arm 206 which, in effect, projects into the annulus bore at one side of rod 85a. The arm is mounted for pivotal movement at 207 about a horizontal axis represented by pivot pin 208 which is in a vertical axial plane of pilot 173 and lies just over the opposed ends of annulus segments 202 and 203 at the side opposite the pilot. Pin 208, in turn, is supported in bridge-posts 184, being held against axial dislodgment by having one of its ends 209 turned down into arm-socket 210 (Fig. 22). The distal end 211 of arm 206 is provided, at its under side, with a counter-balance 212.

At the opposite side of rod 85a, segment 203 carries a short arm 213, parallel to arm 206, which is pivotally connected at 214 to the pin 208 lying at said opposite side of the rod. Depending from each arm 206 is a crank ear 215 which is apertured to take an arm 200 of one of the torque rods 196. When the annulus 201 is in the "off" position of Fig. 22 (corresponding to the full-line position of Fig. 25) the point of pivotal connection 216 between a given ear 215 and its associated rod-arm 200 lies in vertical alinement with the associated pivot pin 208.

It will be seen that if torque assembly 194 be rotated in a counterclockwise direction, from the aspect of Fig. 24, the crank ear 215 associated with segment 203 will be swung in a clockwise direction, as viewed in Fig. 25, thus swinging the segment, itself, towards, to, or beyond the dotted line position of Fig. 25, thus exposing one half of the upper end of main wick 29a so it may automatically be ignited from pilot 173. The same movement of the torque assembly 194 causes coincident and equal counter-clockwise rotation of segment 202, thus simultaneously exposing the other half of the main wick 29a to the pilot flame. The previously described capacity for relative vertical movement between rods 196 and torque ring 193, permits the vertical displacement of rods 196 due to the vertical component of the swinging movement of crank ears 215.

With thermostatic coil 84a in equilibrium, all parts of the assembly are in the full line positions of Figs. 22 to 26. If, now, coil 84a is exposed to a rising temperature, its reaction imposes a torque on ring 193 and assembly 194 tending to swing crank ears 215 in directions which more tightly seat the snuffer segments on the upper end of cartridge 23a. On the other hand, if the coil is exposed to a lowering temperature, its reaction through the torque mechanism tends to swing the segments 202, 203 in directions uncovering the main wick 29a and thus allowing it to be automatically lighted from the constantly burning pilot.

It will be obvious that, with the upper end of coil 84a held against rotation, rotation of rod 85a by handle 107a imposes on coil 84a a regulatory stress. Scale 189 is so calibrated that any given setting of the regulating handle with respect to that scale, establishes a pre-stressing of the coil such, that when the coil is subsequently exposed to the indicated temperature, said coil will be substantially in equilibrium and therefore all elements will be in the positions of Fig. 22. If the temperature drops below the indicated temperature, the coil, in seeking to reach its position of equilibrium for the new temperature, acts through torque assembly 194 to elevate the snuffer segments and thus cause the automatic lighting of the main burner. Then, as the temperature rises and finally reaches the indicated degree, the coil 84a is restored to its original condition of equilibrium and the snuffer 201 is returned to the position of Fig. 22, thus snuffing the main burner flame, but not, of course, interfering with the pilot flame.

The pilot tips described in connection with the embodiments so far discussed are for the purpose of protecting the pilot flame from drafts when the main burner flame is extinguished. However, such a protection is not always necessary, or it may be provided by other shielding means, carried, for instance by the annulus 46. We have shown such means in Figs. 27 to 29. It will be observed that in this embodiment the pilot wick is merely that portion of the main burner wick which directly underlies the annulus bore 50 when the snuffer annulus is in extinguishing position. It is to be understood that all claims wherein the pilot wick is mentioned without specifically calling for the pilot tip, are intended to include situations wherein the pilot wick is actually that portion of the main wick that underlies the annulus bore when the snuffer is in extinguishing position, whether the upper face of said portion is in the plane of or vertically offset from the plane of the upper face of the remainder of the wicking.

The jacket 27b of burner cartridge 23b may be of the type shown in Figs. 14 to 16, and the wicking, both main and pilot, may be of the types illustrated in Figs. 16 and 20. However, since we are here illustrating a situation where the pilot wick is not a separable entity, the wicking 29b may be of the nature illustrated in Fig. 16 except that the sectorial sections meet at the center, or, as illustrated in Fig. 27 the entire wick may be of one mass. The central, circular portion 28b of the wicking 29b which directly underlies the bore 50 of annulus 46 acts as the pilot wick of the assembly. It will be seen that this pilot flame area is circumferentially defined by the wall of bore 50 and the flame therefrom will not be extinguished by reciprocation of the annulus 46b. The pilot flame will re-ignite the gases from the remainder of the wicking as soon as annulus 46 is raised sufficiently.

Arm 48b is similar to and mounted in the same manner as arm 48. Annulus 46 has a pivotal connection with arm 48b of the type already described. However, there is also provided on the annulus a pilot-flame draft guard generally indicated at 219. The guard consists of a vertical plate 220 secured to the top of the annulus at 221 and extending diametrically across bore 50 and in a plane normal to the axis of arm 48b. The plate is cut away at 222 to allow for the passage of fork arms 56. The cut outs also permit relative pivotal movement between arms 56 and annulus 46, but the extent of such movement is limited by the oppositely projecting, horizontal stops 223 struck from plate 220 above arms 56. These stops, in their coaction with arms 56 prevent the accidental tilting of the annulus to an extent which might otherwise cause the annulus to catch in or dig into the wick material 29b.

It will be noted that the plate-portion 224 extends downwardly through bore 50 to a point in close proximity with wick 29b when the annulus is in snuffing position, while the upper part of the plate extends well above annulus 46, thus serving as a draft-shield which protects at least half of the pilot flame when the annulus is fully depressed—at least as to drafts which are in or approximately in a direction normal to the plane of the plate. The arms 56 serve as partial pilot-flame shields against drafts coming in from other directions.

While we have shown and described preferred embodiments of our invention, various changes in design, structure and arrangement may be made without departing from the spirit and scope of the appended claims.

We claim:

1. In a heater, a body member, there being a fuel reservoir formed within said body member, a vertically arranged, cylindrical wick presenting the outer, annular portion of its upper end face as an annular main burner and its central portion as a pilot burner, said wick being positioned to be in capillary association with reservoir fuel, an annular flame controlling member supported on said body member in a position of substantial coaxiallity with said wick and movable substantially axially and with respect to said end face to and from a position adapted to extinguish flame from the main burner, thermostatic means supported by the body member in a position to be operative responsive to changing temperature conditions of the air about the exterior of the body member, and an operative connection between said means and said controlling member whereby a drop in the temperature about said heater tends to move said flame controlling member away from said position and a rise in said temperature tends to move said flame controlling member towards said position; said pilot burner being in line with the bore of said annular controlling member during periods of movement and rest of said controlling member.

2. In a heater, a body member, there being a fuel reservoir formed within said body member, a vertically arranged, annular burner wick presenting its upper end face as an annular main burner, a pilot wick within the bore of the burner annulus, said wicks being positioned to be in capillary association with reservoir fuel, an annular flame controlling member supported on said body member for movement with respect to said end face to and from a position adapted to extinguish flame from the main burner, thermostatic means supported by the body member in a position to be operatively responsive to changing temperature conditions of the air about the exterior of the body member, and an operative connection between said means and said controlling member whereby a drop in the temperature about said heater tends to move said flame controlling member away from said position and a rise in said temperature tends to move said flame controlling member towards said position; said pilot wick being in line with the bore of the controlling member and thus out of the effective path of said controlling member during its periods of movement and rest.

3. In a heater, a body member, there being a fuel reservoir formed within the body member, a vertically arranged body of wicking supported by said body member and extending into said reservoir, said wicking body having its upper end face exposed as a main burner, the area of said face being relatively large, a tubular pilot burner tip extending upwardly from and with its axis normal to said upper face, the transverse cross-sectional area of said tip being relatively small, wicking within said tip and extending into said body of wicking, a flame-controlling member supported by said body member for movement to and from a position adapted to snuff main burner flame without affecting pilot burner flame, thermostatic means supported by the body member in a position to be operatively responsive to changing temperature conditions of the air about the exterior of the body member, and an operative connection between said means and said controlling member whereby a drop in the temperature about said heater tends to move said flame controlling member away from said position and a rise in said temperature tends to move said flame controlling member towards said position; said pilot wick being out of the effective path of said controlling member during its periods of movement and rest.

4. In a heater, a body member, there being a fuel reservoir formed within the body member, a burner cartridge removably suported by said body member, said cartridge embodying a tubular jacket, a body of wicking within the jacket and having one end positioned to dip into reservoir fuel and having a portion of its other end face exposed as a main burner and another portion exposed as a pilot burner, a flame controlling member supported by said body member for movement to and from a position adapted to extinguish flame from the main burner, thermostatic means supported by the body member in a position to be operatively responsive to changing temperature conditions of the air about the exterior of the body member, and an operative connection between said means and said controlling member whereby a drop in the temperature about said heater tends to move said flame controlling member away from said position and a rise in said temperature tends to move said flame controlling member towards said position; said pilot burner being out of the effective path of said controlling member during its periods of movement and rest.

5. In a heater, a body member, there being a fuel reservoir formed within said body member, a burner wick presenting one portion of its upper end face as a main burner and another portion exposed as a pilot burner, said wick being positioned to be in capillary association with reservoir fuel, a control unit bodily movable into and out of connection with the body member, said unit comprising a housing, a flame controlling member supported on said housing for movement to and from a position adapted to extinguish flame from the main burner, thermostatic means supported by said housing in a position to be operatively responsive to changing temperature conditions of the air about the exterior of the body member, and an operative connection between said means and said controlling member whereby a drop in the temperature about said heater tends to move said flame controlling member away from said position and a rise in said temperature tends to move said flame controlling member towards said position; said pilot burner being out of the effective path of said controlling member during its periods of movement and rest.

6. In a heater, a body member, there being a fuel reservoir formed within the body member, a burner cartridge removably supported by said body member, said cartridge embodying a tubular jacket, an annular body of wicking within the jacket and having one end positioned to dip into reservoir fuel and having its other end face exposed as a main burner, a pilot wick terminating adjacent said other end face of the body of wicking, a control unit within the bore of the wicking annulus and comprising a housing, a flame controlling member supported on said housing for movement to and from a position adapted to snuff flame from the main burner, thermostatic means supported by said housing in a position to be operatively responsive to changing temperature conditions of the air about the exterior of the body member, and an operative connection between said means and said controlling member whereby a drop in the temperature about said heater tends to move said flame controlling member away from said position and a rise in said temperature tends to move said flame controlling member towards said position; said pilot wick being out of the effective path of said controlling member during its periods of movement and rest.

7. In a heater, a body member, there being a fuel reservoir formed within the body member, a burner cartridge removably supported by said body member, said cartridge embodying a tubular jacket, an annular body of wicking within the jacket and having one end positioned to dip into reservoir fuel and having its other end face exposed as a main burner, a pilot wick terminating adjacent said other end face of the body of wicking, a control unit within the bore of the wicking annulus and comprising a housing, a flame controlling member supported on said housing for movement to and from a position adapted to snuff flame from the main burner, thermostatic means supported by said housing in a position to be operatively responsive to changing temperature conditions of the air about the exterior of the body member, and an operative connection between said means and said controlling member whereby a drop in the temperature about said heater tends to move said flame controlling member away from said position and a rise in said temperature tends to move said flame controlling member towards said position; said pilot wick being out of the effective path of said controlling member during its periods of movement and rest, and common releasable means holding the cartridge and control unit against displacement from the body member.

8. In a heater, a body member, a cylindrical, vertically arranged wick member supported by the body member with its upper end face exposed at the top of the body member, a chimney supported by the body member in concentric relation with the wick member and vertically spaced thereabove, an apertured flame-control member supported by the body member between the chimney and wick member and movable vertically to and from a position closely covering at least a portion of said wick end face, thermostatically controlled means for so moving said flame-control member, means limiting the upward movement of the flame-control member, and an internal annular baffle at the lower end of the chimney, said baffle being annularly spaced from and approximately in the plane of the flame-control member when the latter is at the limit of its upward vertical movement.

9. In a heater, a body member, a cylindrical, vertically arranged wick member supported by the body member with its upper end face exposed at the top of the body member, a chimney supported by the body member in concentric relation with the wick member and vertically spaced thereabove, an apertured flame-control member supported by the body member between the chimney and wick member and movable vertically to and from a position closely covering at least a portion of said wick end face, thermostatically controlled means for so moving said flame-control member, and an annular, horizontal radiation shield extending around the upper end of the wick member, means limiting the upward movement of the flame-control member, and an internal annular baffle at the lower end of the chimney, said baffle being annularly spaced from and approximately in the plane of the flame-control member when the latter is at the limit of its upward vertical movement.

10. In a heater, a body member, there being a fuel reservoir formed within said body member, a wick presenting its puper end as a burner, said wick being positioned to be in capillary association with reservoir fuel, a vertical tube extending through the reservoir and opening at top and bottom to the atmosphere, and a burner-control unit bodily movable into the tube, and means releasably holding the unit in fixed position within the tube; said control unit comprising a housing, a flame controlling member supported on said housing for movement to and from a position adapted to extinguish flame from the burner, thermostatic means supported by said housing in a position to be operatively responsive to changing temperature conditions of the air about the exterior of the body member, and an operative connection between said means and said controlling member whereby a drop in the temperature about said heater tends to move said flame controlling member away from said position and a rise in said temperature tends to move said flame controlling member towards said position.

References Cited in the file of this patent

UNITED STATES PATENTS

| Number | Name | Date |
|---|---|---|
| 204,478 | Buehrig | June 4, 1878 |
| 525,490 | Davis | Sept. 4, 1894 |
| 648,998 | Rundell | May 8, 1900 |
| 1,041,083 | Holmes et al. | Oct. 15, 1912 |
| 1,128,263 | Wagandt | Feb. 9, 1915 |
| 1,157,255 | Quinn | Oct. 19, 1915 |
| 1,397,873 | Leard | Nov. 22, 1921 |
| 1,509,206 | Holbrook | Sept. 23, 1924 |
| 2,192,389 | Trca | Mar. 5, 1940 |
| 2,215,767 | Richardson | Sept. 24, 1940 |
| 2,276,872 | Quinn | Mar. 17, 1942 |
| 2,315,906 | Stanford | Apr. 6, 1943 |
| 2,504,584 | Ramos | Apr. 18, 1950 |
| 2,507,493 | Bailey | May 16, 1950 |